United States Patent [19]

Malinovski et al.

[11] 4,123,280

[45] Oct. 31, 1978

[54] SILVER HALIDE VAPOR DEPOSITION METHOD

[75] Inventors: Yordan P. Malinovski; Borislav D. Mednikarov; Jakob J. Assa, all of Sofia, Bulgaria

[73] Assignee: Zlafop pri BAN, Sofia, Bulgaria

[21] Appl. No.: 586,429

[22] Filed: Jun. 12, 1975

[30] Foreign Application Priority Data

Jun. 14, 1974 [BG] Bulgaria .................................. 26984

[51] Int. Cl.[2] ........................ G03C 1/02; C23C 13/00; B05B 13/06; C03C 5/00

[52] U.S. Cl. ................................ 96/94 BF; 427/255; 427/404; 427/238

[58] Field of Search ............ 96/94 BF; 427/255, 404, 427/305, 313, 237, 238; 432/210, 211; 219/271, 275

[56] References Cited

U.S. PATENT DOCUMENTS

| | | | |
|---|---|---|---|
| 2,945,771 | 7/1960 | Mansfeld | 96/94 BF |
| 3,219,451 | 11/1965 | LuValle et al. | 96/94 BF |
| 3,544,763 | 12/1970 | Geir | 219/271 |
| 3,775,157 | 11/1973 | Fromson | 427/404 |

OTHER PUBLICATIONS

Maissel and Glang–Thin Film Tech. Hdbk., Chap. 18, p. 17; Chap. 2, pp. 40–41, ©1970.

*Primary Examiner*—David Klein
*Assistant Examiner*—Louis Falasco
*Attorney, Agent, or Firm*—Finnegan, Henderson, Farabow & Garrett

[57] ABSTRACT

There are disclosed a method and an apparatus for the production of photographic materials by vacuum deposition of silver halides on a continuously moving substrate. The silver halides are heated in a crucible placed within a vacuum chamber by radiant heating means disposed outside the chamber and the crucible is so shaped and positioned so close to the continuously moving substrate that a stream of silver halide vapour impinges perpendicularly on the substrate and silver halide is deposited on the substrate at a rate of 200 to 2000 A/sec. The substrate is usually primed with a layer of a material which enhances deposition of the silver halide thereon. The use of the photographic material thus produced in the production of direct positive and negatively emitting photographic materials is described.

35 Claims, 2 Drawing Figures

SILVER HALIDE VAPOR DEPOSITION METHOD

BACKGROUND OF THE INVENTION

This invention relates to a method and an apparatus for the production of photographic materials by vacuum evaporation of silver halides and vapour deposition thereof on a continuously moving substrate.

The idea of producing photographic materials by vacuum evaporation of silver haides has been known for a substantial time. Photographic materials prepared in this way have, in principle, considerable advantages over conventional light sensitive emulsion-coated photographic materials, namely:

1. Simple and fast processing owing to the absence of a binder;
2. High optical homogeneity reducing Raleigh scattering in the recording medium and allowing an image to be obtained which is particularly sharp;
3. A photographic material is obtained which is always thinner than the depth of focus of objectives when employing a high aperture number so that distortion of the projected image in the volume of the photographic layer is avoided;
4. High sensitivity to low energy ionizing particles and short wave ultra violet light.

These advantages are of particular value in the production of special photographic masks for use in production of microelectronic components or in systems for optical storage of information.

In spite of these advantages and the many attempts hitherto made to improving manufacturing techniques no photographic material produced by vacuum evaporation of silver halides has hitherto been entirely satisfactory. None of the methods for the production of photographic materials is entirely reproducible. This is believed to be due to the inclusion of impurities in the silver halide layers, which influence uncontrollably the properties of the silver halide layers.

Attempts have been made to reduce the impurity content of vacuum deposition-produced photographic materials and produce products with reproducible sensitivity. Thus for example in British Patent Specification No 1,150,626, a substrate, onto which silver bromide is deposited, is cooled to $-50°$ C in order to prevent the evolution of volatile substances from the substrate, for example paper, surface contaminating the deposited silver bromide and influencing undesirably its sensitivity. In British Patent Specification No. 1,166,999 evaporation of silver bromide is carried out from a silver crucible or from a crucible of very pure, mechanically strong graphite, and the walls of the vacuum chamber employed are covered with a substance which does not react with the silver bromide, for example silver, nickel, Monel metal, glass or plastics material free from volatilizable constituents.

It is, however, well known that pure silver bromide crystals are completely insensitive and do not form, when exposed to light, a developable latent image. Reference is made here to British Patent Specification No. 1,154,741. The photographic sensitivity of silver halides is in fact due to the sensitizing action of different impurities (metal salts, sulphur compounds, etc.). The fact that the silver halide layers obtained by the methods described in British Patent Specifications Nos. 1,150,626 and 1,166,999 are light sensitve is definite proof that uncontrollable contamination of the material nevertheless occurs during the production thereof. Obviously methods employed hitherto cause the uncontrollable inclusion of impurities during the process of evaporation and deposition of silver halides on a substrate. Not even the method described in British Patent Specification No. 1,154,741 for doping ultra-pure light insensitive silver bromide, in which silver bromide is first vacuum deposited on a moving substrate will, in fact, yield a light-insensitive silver bromide layer on the substrate and sensitizing by subsequent doping is not reproducible.

It would therefore seem that to prepare silver halide layers having fully controllable and reproducible properties, a method for vapour deposition of highly pure photo insensitive silver halide layers having no photographic sensitivity at all must be devised. Such layers can then be subjected to deliberate and controllable sensitization to provide a material having reliable and reproducible properties.

A common feature of all the aforesaid methods is the direct contacting of the heating element of the crucible with the silver halide melt. Since a silver halide is a good ionic conductor when in the molten state, the silver halide is caused to undergo electrolytic decomposition by the current flowing through the heating element. Since thermal decomposition of silver halides is autocatalytic the formation of electrolytic silver therefrom enhances evolution of highly reactive halogen gas, which is believed to be partially responsible for the contamination of the silver halide layers.

OBJECT OF THE PRESENT INVENTION

It is an object of the present invention to provide a method for vacuum evaporation and deposition (hereinafter termed simply vacuum deposition) of pure silver halide layers on a continuously moving support to which has been applied a priming layer for enhancing silver halide substrate adhesion for a vacuum deposited silver halide layer, whereby uncontrollable sensitization of the silver halide layer by impurities in the vacuum chamber is avoided, so that the photographic material obtained has fully reproducible and controllable properties.

SUMMARY OF THE INVENTION

According to one aspect of this invention, there is provided a method for the production of a photographic material constituted by a silver halide-coated substrate, which comprises placing a silver halide having a purity of not less than 99.999% in a crucible which is formed of a material which is inert when heated to an elevated temperature and which is disposed in or constitutes part of a chamber which is evacuated, heating the crucible by radiant heating means disposed outside the vacuum chamber and positioned and shaped to provide substantially uniform heating of the crucible and its contents and passing over the crucible a substrate primed with a substance which enhances the adhesion of solidified silver halide vapour to the substrate, the crucible being so shaped that a concentrated stream of silver halide vapour issues therefrom and impinges perpendicularly on the substrate which is positioned not more than 10 mm from wall means of the crucible between which passes said stream, and the heating of the crucible and shape of the crucible being such that a silver halide layer is deposited on the substrate at a rate of 200 to 2000 A/sec.

According to a second aspect of the invention, there is provided apparatus for use in the production of a photographic material constituted by a silver halide coated substrate, which comprises an elongate crucible formed of a material which is inert when heated to an elevated temperature, crucible support means adapted both to grip the crucible and for attachment to wall means partially defining a chamber adapted for connection to vacuum producing means so that the assembled crucible, crucible support means and wall means define the chamber in which a vacuum can be produced, in use, by said vacuum producing means, the apparatus further comprising radiant heater means for substantially uniformly heating the crucible, disposed in the crucible support means and outside said chamber and means within said chamber for effecting travel of a substrate over a rectangular outlet from the crucible positioned within said chamber, the transverse cross-sectional area of the elongate crucible being at least five times the cross-sectional area of said outlet and said travel effecting means being so positioned that, in use, a said substrate will travel over said outlet with one surface thereof not more than 10 mm from the outlet, whereby silver halide vapour produced in the crucible, in use, makes contact only with heated wall means defining the crucible and the substrate.

When carrying out the method of this invention, silver halides are placed in a crucible made out of an inert material, for example quartz, silver, or highly pure, mechanically strong graphite. The crucible is heated by a radiant heater to ensure that the whole of the crucible including its parallel elongate walls possesses the same temperature. This manner of heating the crucible coupled with the formation of the outlet therefrom enables an intensive stream of silver halide vapour to be directed on to the substrate. The substrate, which carries a thin priming layer, is preferably heated immediately before and during the evaporation process usually by radiant heating means positioned within the confines of the vacuum chamber but whose heating element is out of contact with the vacuum chamber, and is moved at a uniform rate above the crucible at a distance not larger than 10 mm from the hot walls of the crucible surrounding the outlet therefrom. The stream of silver halide vapour impinging directly on the substrate enables a silver halide layer to be built rapidly thereof at a rate of from 200 to 2000 A/sec. This rapid rate of deposition especially when the substrate is at an elevated temperature prevents adsorption of impurities during the deposition process and enables uniform, very pure, completely light insensitive layers of silver halide having a thickness preferably of from 0.1 to 1.5 microns, more preferably from 0.1 to 0.5 microns to be obtained. Fully controllable and reproducible sensitization of the silver halide layer by, for example, gold-iridium treatment to obtain a negative imaging photographic material, or its fogging by the additional vacuum deposition of a monoatomic layer of silver or gold to obtain a positive imaging photographic material can then be effected. Other vapour deposition sensitization methods for producing both positive and negative imaging photographic materials are described in British Patent Specification No. 1,154,741. Sensitization can also be effected by conventional methods used for sensitizing conventional emulsions.

The substrate used for the production of the photographic materials by the method of this invention is preferably heated in the vacuum chamber by radiant heating means prior to the deposition of the silver halide. When the substrates are glass or mica plates, they can be heated up to 200° C, whereas polyester or acetate film or plastics material-covered paper base should generally not be heated higher than 100° C. When the evaporation depositon is complete, the vacuum chamber is filled with 99.999% pure nitrogen, that is nitrogen of a purity generally required in the semiconductor industry. In this way, micro-pores in the surface of the fresh silver halide layer produced are efficiently occupied by adsorbed very pure and photographically inactive nitrogen. In this way, any tendency for the silver halide layer to be irreproducibly sensitized by the uncontrollable adsorption of impurities occasionally present in the air is precluded.

The substrates employed in the process of this invention will usually be primed to enhance the adhesion thereto of the silver halide vapour. However, such priming can usually be avoided when the substrate is formed of freshly cleaved mica. When priming is effected, particularly suitable primer layers for application to substrates used in the method of this invention have been found to be the commercially available photoresist lacquers based on polyvinyl cinnamate (for example KTFR, a product of Eastman Kodak Co.) or on polyisoprene (for example Copyrex RN 40, a product of Agfa-Gevaert). These lacquers enable particularly effective silver halide/substrate adhesion to occur, the adhesion being much better than when coating layers of gelatin or silicon monoxide are used and, at the same time, are suitable for use when sensitization is to be effected using aqueous solutions of sensitizers. These lacquers also cause an increase in the resolution of the final photographic material.

Especially when a direct positive photograhic material with high sensitivity is to be obtained the priming layer is preferably constituted by a metal chromate layer up to 500A thick, deposited onto the heated substrate by vacuum deposition. Lead chromate, basic lead chromate, barium chromate, silver chromate, or bismuth chromate can be employed as metal chromate, lead chromate being preferred.

The speed of a direct positive photographic material produced from a substrate coated with silver halide by the method of the invention, is also considerably increased if, prior to fogging with a monoatomic silver or gold film, the silver halide layer is coated with a gelatin layer up to 0.1 microns thick. The gelatin layer causes a considerable increase in the speed of the photographic material produced; the bleaching of the positive material on image-wise exposure to light requires 30 to 40 times less light energy.

Apparatus according to the second aspect of the invention will usually be employed with an oil diffusion vacuum pump capable of maintaining in the vacuum chamber of the apparatus, a vacuum of $10^{-5}$ to $10^{-6}$ mm.Hg. In the vacuum chamber are mounted a device from which silver halide is to be evaporated, means for obtaining the uniform motion of the substrates for example a track having an associated mechanism for displacing the substrate thereover and a resistance, that is radiant, heater for heating the substrate. The vacuum chamber can be made of stainless, corrosion resistant chromium nickel steel. All other surfaces in the vacuum chamber can be formed of quartz and polytetrafluoroethylene and any electrical leads which must enter the vacuum chamber, for example for heating means for the substrate or for thermocouples for controlling the temperature of the silver halide melt, can be formed of silver or platinum. Thus the vacuum chamber will be free from substances likely to contaminate the deposited silver halide.

DETAILED DESCRIPTION OF THE PREFERRED EMBODIMENT

Figure 1:
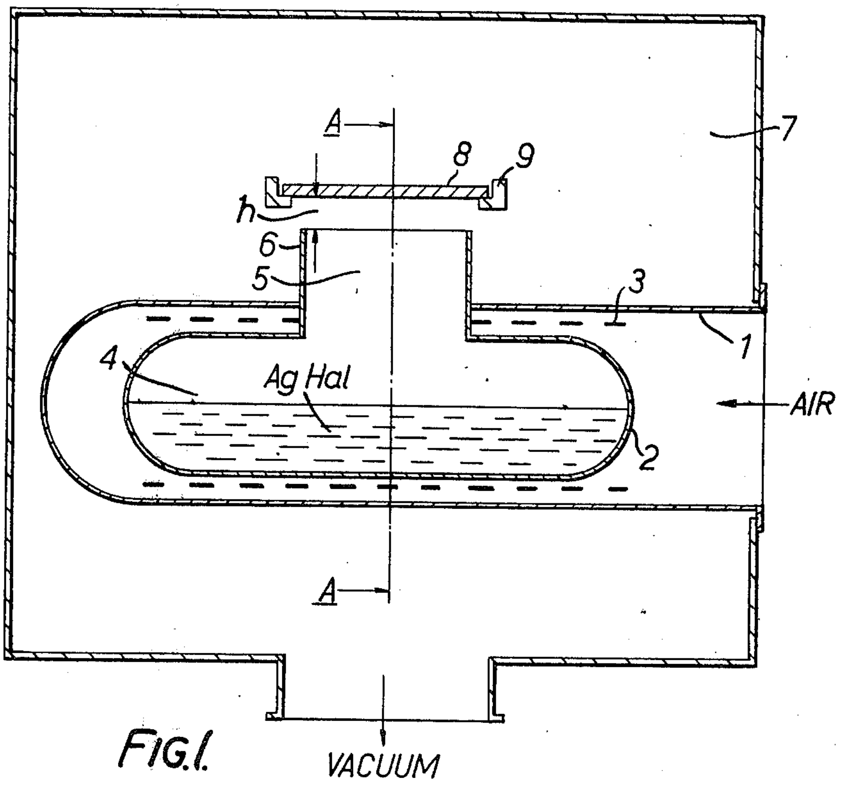
FIG. 1 is a vertical section through apparatus according to this invention for use in the production of a silver halide-coated substrate having no photographic response.

Referring to the drawing, the apparatus comprises a tube carrier 1, a crucible 2 of special shape and electric resistance heater 3.

The tube carrier 1 and the crucible 2 are formed as an integral unit out of quartz, silver, or highly pure mechanically strong graphite. The crucible is specially designed for use in the method of this invention and consists of a relatively large cylindrical body 4 having a rectangular opening into a neck section 5 formed by opposed pairs of parallel elongate walls 6, extending into a vacuum chamber 7. The cylindrical section of the crucible, is filled with silver halide and its cross-section is at least 5 times in the plane shown in FIG. 1 the magnitude of the cross section of the neck 5. Around the crucible but outside of the vacuum chamber 7 is mounted the heater 3 which is selected to ensure uniform and controllable temperature of the contents and the walls of the crucible 2. The illustrate shape of the crucible provides a relatively large surface area of molten silver halide in the body 4 thereof and the silver halide vapour formed therefrom can be concentrated into a stream between the walls 6 of the neck 5. The concentrated stream of silver halide vapour will travel perpendicularly to a substrate 8 moving on a track 9, placed at a distance not more than 10 mm from the outlet from the neck 5. In this way a high rate of deposition of silver halide on the substrate is obtained. Even at a temperature lower than the decomposition temperature of the silver halide, a deposition rate not less than 200 A/sec can be obtained readily. The entire tube carrier is surrounded by a silver shield (not shown) and is cooled with water, and is formed with an opening providing a tight fit around the heated walls 6 of the neck 5 of the crucible 2. In this way the silver halide vapours come in contact only with the crucible and the heated substrate and there is no possibility of impurities being included in silver halide which is deposited.

The following Examples illustrate the present invention.

EXAMPLE 1

A number of glass plates were kept immersed for several hours in hot dichromate/sulphuric acid solution and were then rinsed well in deionized water. After drying they were coated by vacuum deposition with a thin layer of silicon monoxide about 0.1 microns thick. The plates thus cleaned and primed were then ready for deposition of a silver halide by the vacuum deposition method, the silicon monoxide of the priming layer being a material to which silver halide adheres well even at room temperature. The coated glass plates were used in the following three runs 1.1 to 1.3.

Figure 2:
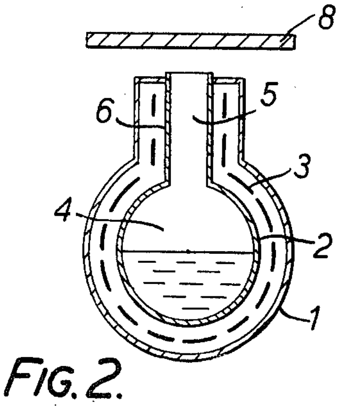
FIG. 2 is a vertical section through the apparatus of FIG. 1 taken at A—A.

1.1. Apparatus of the type shown in FIGS. 1 and 2 was assembled. A quartz crucible 2 was mounted in the holder 1 in such a manner that the top of the neck 5 of the crucible was 10 mm below the supporting track 9 along which the glass plates were being moved. Before assembling the apparatus, the quartz crucible was first carefully washed and then charged with silver bromide of 99.999% purity. The vacuum chamber 7 was evacuated to a pressure of less than $10^{-5}$ mm.Hg and the silver bromide was heated up to 600° C by heat emanating from the heater 3 mounted outside the vacuum chamber. A silver bromide vapour stream of high intensity, passed out of the crucible and silver bromide was deposited at a rate of about 400 A/min. The rate of travel of the glass plate was so chosen that a silver bromide layer 0.5 microns thick was built up thereon. A number of the glass plates were passed one after the other over the crucible for coating.

After cooling the crucible, the vacuum chamber was filled with pure nitrogen and after several minutes the silver bromide-coated glass plates were removed from the vacuum chamber.

1.2. The procedure of run 1.1 was repeated but using a tungsten heater inside the crucible in direct contact with the silver bromide.

1.3. In this run a conventional apparatus for vacuum deposition of silver bromide on a substrate was employed. A tungsten boat was mounted about 100 mm below a holder for the glass plates to be used. After charging the tungsten boat with silver bromide and evacuating the vacuum chamber to a pressure of less than $10^{-5}$ mm.Hg the tungsten boat was heated by connecting leads from the boat to a suitable low voltage power supply, and maintained at a temperature of about 600° C. Under these conditions it took about 10 min for a silver bromide layer 0.5 microns thick to form on the substrate. After cooling the boat and admitting air into the vacuum chamber the samples were taken out.

Samples from all three runs were exposed to a flash lamp through a sensitometric step wedge and were developed simultaneously for 40 sec in Mitchell developer having the composition:

| | | |
|---|---|---|
| metol | 0.67 | g |
| anhydrous sodium sulphite | 26 | g |
| hydroquinone | 2.5 | g |
| anhydrous sodium carbonate | 26 | g |
| potassium bromide | 0.67 | g |
| gelatin | 1.67 | g |
| water to | 1 | l |

The samples were then dipped for several seconds in an acetic acid stop bath, were well rinsed with water, and dried. The densities obtained were measured on a standard densitometer.

Further samples from all three runs were subjected to gold-iridium sensitization as described by Saunders (J.Chem. Phys., 37, 1126/1962/) using an aqueous solution containing sodium aurodithiosulphate (20 mg/l), ammonium chloroiridite (20 mg/l) and gelatin (0.5 g/l). After rinsing and drying all the samples were exposed, developed and their densities were measured in the same way as the first batch of samples.

The results obtained are summarized in Table I.

TABLE I*

| Run | Treatment | Fog (Do) | Maximum density ($D_{max}$) | Contrast $\gamma$ | Relative sensitivity ($S_{rel}$) |
|---|---|---|---|---|---|
| 1.1 | Unsensitized | 0 | 0 | 0 | 0 |
| | Sensitized | 0.05–0.10 | 2.50–2.70 | 1.20–1.50 | 500–600 |

TABLE I*-continued

| Run | Treatment | Fog (Do) | Maximum density ($D_{max}$) | Contrast γ | Relative sensitivity ($S_{rel}$) |
|---|---|---|---|---|---|
| 1.2 | Unsensitized | 0.05–0.10 | 1.10–1.20 | 0.80–1.00 | 80–100 |
| | Sensitized | 0.15–0.20 | 1.30–1.50 | 0.80–1.20 | 100–150 |
| 1.3 | Unsensitized | 0.10–0.20 | 0.80–1.20 | 0.70–1.00 | 20–100 |
| | Sensitized | 0.20–0.30 | 1.00–1.50 | 0.80–1.00 | 50–110 |

*In all batches some samples showed inadequate adhesion. After slightly prolonged processing, marked tendency for peeling of the silver bromide layer from the glass substrate is observed.

It can be seen from Table I that the unsensitized samples of the first run 1.1 in contrast to the samples of runs 1.2 and 1.3, do not exhibit any photographic sensitivity. They can however be sensitized very successfully by the goldiridium method and then show considerably higher speed and better reproducibility than the samples prepared in run 1.2 and, especially run 1.3. The samples obtained in run 1.3 show the worst and most unreproducible parameters and are practically not influenced by the sensitization. The second run 1.2 gives more reproducible results but the sensitivity is still relatively low and cannot be much improved on by further sensitization.

EXAMPLE 2

Glass plates, cleaned in the manner described in Example 1, were given a substrate for silver bromide adhesion in three different ways in the following runs 2.1, 2.2 and 2.3.

2.1 In this run the plates were provided with a silicon monoxide layer in the manner described in Example 1.

2.2 In the second run the plates were provided with a 100 A thick layer of lead chromate by vacuum deposition.

2.3 In the third run the plates were covered on a centrifuge with a thin layer of KTFR photoresist, following the procedure recommended by the manufacturer, Eastman Kodak Co., of Rochester, N.Y., U.S.A.

The samples from the above three runs were all covered with a 0.35 microns thick layer of silver bromide by the procedure set out in run 1.1 of Example 1. As in the case of the products of run 1.1 of Example 1. unless they were specially sensitized, none of the plates showed on exposure any photographic response whatsoever. As will be indicated hereinafter, this makes them singularly suitable for use in the production of photographic materials capable of yielding on imagewise exposure to light a direct positive image.

For this purpose all the samples produced in runs 2.1, 2.2 and 2.3 and provided with AgBr coatings were subjected to deliberate fogging by additional deposition thereon of a monoatomic layer of silver, following the technique described by Malinowski Commun. Inst.-Phys.Chem.,Bulg.Acad.Sci., 3, 119/1963/). Fogging was carried out so that the density obtained on development without exposure of selected samples was about 3.

After fogging the layers were exposed imagewise through a step wedge and developed in the manner described in Example 1. All samples showed well expressed bleaching of the initial density caused by the deliberate fogging with silver.

The results obtained are summarized in Table II.

TABLE II*

| Run | Priming layer | Minimum density ($D_{min}$) | Maximum density ($D_{max}$) | γ | $S_{rel}$ |
|---|---|---|---|---|---|
| 2.1 | Silicon monoxide | 0.10–0.15 | 2.80–3.00 | 1.50–2.00 | 40–60 |
| 2.2 | Lead chromate | 0.01–0.05 | 2.80–3.20 | 1.70–2.10 | 150–180 |
| 2.3 | KTFR | 0.05–0.10 | 2.90–3.30 | 1.70–2.00 | 80–90 |

*The inadequate adhesion of the silver bromide layers deposited on silicon monoxide is again noticed. No tendency however of the layer coated on the other two substrates to peel is observed.

As can be seen from Table 2, on sufficient exposure all the samples were entirely bleached, the remaining density (largely equivalent to the fogging) being slightly higher on the glasses provided with a silicon monoxide coating. The maximum density of the nonilluminated areas achieved by fogging with silver and the effective sensitivity to bleaching were higher with glass substrates provided with a lead chromate coating (run 2.2) or KTFR coating (run 2.3). Clearly, therefore, KTFR and lead chromate are superior coating agents to silicon monoxide when photographic materials for use in direct positive processes are to be produced.

EXAMPLE 3

Freshly cleaved mica was exployed in place of glass as substrate material. Two runs were carried out, runs 3.1 and 3.2.

3.1 In this run a silver bromide layer was deposited onto the mica substrate by the procedure described in run 1.1 of Example 1. During the experiment the substrates were kept at room temperature.

3.2 In the second run, prior to coating with silver bromide, the mica substrates were heated to 200° C by means of a halogen filament lamp within the vacuum chamber, the heating element of the lamp (a tungsten wire) being enclosed in a glass bulb, that is, out of contact with the vacuum chamber.

The adhesion of the silver bromide to the mica substrates was very good in each case and was not significantly affected by the substrate temperature used.

One half of the samples obtained in each run were treated by gold-iridium sensitization to yield a negative imaging photographic material as described in Example 1, while the other half of the samples in each run were fogged with silver to produce a positive imaging photographic material, as described in Example 2. All the samples were then exposed and processed in the manner described in Example 1. The photographic characteristics of the layers obtained are compared in Table III.

TABLE III

| Run | Treatment | $D_{min}$ | $D_{max}$ | γ | $S_{rel}$ |
|---|---|---|---|---|---|
| 3.1 | Negatively sensitized | 0.05 | 2.60–2.70 | 1.10–1.20 | 400–500 |
| | Positively sensitized | 0.10 | 2.80–3.00 | 1.50–1.70 | 40–50 |
| 3.2 | Negatively sensitized | 0.05 | 3.00 | 2.00 | 1000 |
| | Positively sensitized | 0.10 | 2.80 | 2.50 | 300 |

It can be seen from Table III that the samples obtained by depositing silver bromide on heated mica substrates had better photographic parameters.

EXAMPLE 4

A number of glass plates were cleaned and provided with a silicon monoxide coating as described in Example 1. A layer of silver bromide, 0.5 microns thick, was then deposited on the plates by the procedure described in run 1.1 of Example 1.

The samples were removed from the vacuum chamber and half of them were given a coating less than 0.1 microns thick of gelatin using 0.1% by weight gelatin solution applied to the plates placed on a centrifuge and then rotated for about 1 min at 5000 rev/min.

All the plates, whether or not coated with gelatin, were again placed in the vacuum chamber. Enough silver was then vacuum deposited on the plates by the procedure referred to in Example 2, so that the density obtained on development without exposure was $D_{max} = 3$. Samples of plates of both types (that is coated with gelatin or not) were exposed and developed as described in Example 1. The results obtained are compared in Table IV.

TABLE IV

| Treatment prior to fogging | $D_{min}$ | $D_{max}$ | $\gamma$ | $S_{rel}$ |
|---|---|---|---|---|
| — | 0.01–0.05 | 3.00 | 2.50 | 40 |
| Coated with gelatin | 0.01–0.05 | 3.00 | 4.00 | 1000 |

It can be seen from Table IV that the provision of gelatin prior to fogging leads to a considerable increase of the sensitivity and the contrast of the image obtained without increasing the minimum density obtained on illumination (the effective fog).

From the foregoing it can be seen that the process of the present invention yields light insensitive silver halide layer coated-substrates which can subsequently be reproducibly sensitized to yield either negative or positive photographic materials if:

1. Direct contact between the heating means for the evaporator (the crucible) and the silver halide melt does not take place; otherwise the heating means will be one of the basic sources of contamination of the silver halide.

2. Conditions are created for obtaining a silver halide vapour stream of high intensity, enabling a high rate of growth of the deposited layer to occur. This high rate of growth in itself reduces the competitive adsorption of impurities in the vacuum chamber. The adsorption of impurities on the substrate is further decreased by the preliminary heating of the substrate immediately prior to the deposition of the silver halide.

3. Adhesion between the vacuum deposited silver halide layer and the substrate is enhanced by the provision of a priming layer, in particular a metal chromate or a photoresist lacquer layer which have the additional advantage of improving the photographic properties of direct positive photographic materials produced from the silver halide-coated substrate.

Furthermore, improved photographic properties of direct positive materials are achieved by coating a thin gelatin film onto the layer of silver halide, immediately prior to the deposition of a monoatomic layer of silver or gold. Selective and irreversible adsorption of impurities contained in the air can be avoided by admitting very pure nitrogen instead of air to the vacuum chamber after the completion of the vacuum deposition process.

We claim:

1. A method for the production of a photographic material including a silver halide-coated substrate which comprises heating a silver halide having a purity of not less than 99.999% under vacuum conditions in a crucible formed of a material that is inert when heated to an elevated temperature with radiant heating means located around the outside of the crucible to achieve substantially uniform heating of the crucible and its contents to effect thereby a sublimation of the silver halide and the production of a concentrated stream of silver halide vapor issuing from an outlet in the crucible, said radiant heating means being located remote from and out of communication with said vacuum conditions, and passing a substrate under said vacuum conditions over the outlet of the crucible at a distance of not more than 10 mm away so that the vapor stream of silver halide issuing from the outlet of the crucible impinges perpendicularly on the substrate, said silver halide being deposited on the substrate at a rate of 200–2000 A/sec.

2. The method of claim 1, in which the substrate is passed over the crucible at a rate such that the silver halide layer is formed in a thickness of from 0.1 to 1.5 microns.

3. The method of claim 2, in which the substrate is passed over the crucible at a rate such that the silver halide layer is formed in a thickness of from 0.1 to 0.5 microns.

4. The method of claim 1, further comprising heating the substrate under said vacuum conditions prior to and during deposition of said silver halide on said substrate with radiant heating means located out of communication with said vacuum conditions.

5. The method of claim 4, in which the substrate is formed of glass or freshly cleaved mica and is heated under said vacuum conditions to a temperature of up to 200° C.

6. The method of claim 4, in which the substrate is formed of polyester or acetate film or plastics covered paper and is heated under said vacuum conditions to a temperature of up to 100° C.

7. The method of claim 1, further comprising priming the substrate with a substance that enhances the adhesion of the silver halide vapor thereto.

8. The method of claim 7, in which the priming substance is a polyvinyl cinnamate or polyisoprene photoresist lacquer.

9. The method of claim 7, in which the priming substance is a vapour deposited metal chromate layer having a thickness of up to 500 A.

10. The method of claim 9, in which the metal chromate is lead chromate.

11. The method of claim 1, further comprising the step of providing an atmosphere of 99.999% pure nitrogen about said coated substrate after depositing said silver halide thereon.

12. The method of claim 1, wherein paid silver halide-coated substrate has zero light sensitivity, further comprising sensitizing said silver halide-coated substrate to convert it to a direct positive photographic material.

13. The method of claim 12, further comprising the step of providing a thin gelatin covering up to 0.1 microns thick on said silver halide-coated substrate prior to sensitizing.

14. The method of claim 13, in which the substrate is passed over the curcible at a rate such that the silver halide layer is formed in a thickness of from 0.1 to 1.5 microns.

15. The method of claim 13, in which sensitization is effected by vapour deposition of a monoatomic layer of silver or gold.

16. The method of claim 13, in which the substrate is formed of freshly cleaved mica or quartz, further comprising heating said substrate under said vacuum conditions prior to and during deposition of said silver halide with radiant heating means located out of communication with said vacuum conditions, said heating being effected to a temperature of up to 200° C.

17. The method of claim 13, in which the substrate is formed of polyester or acetate film or plastics covered paper, further comprising heating said substrate under said vacuum conditions prior to and during the deposition of said silver halide with radiant heating means located out of communication with said vacuum conditions, said heating being effected to a temperature of up to 100° C.

18. The method of claim 13, further comprising priming the substrate with a substance that enhances the adhesion of the silver halide vapor thereto.

19. The method of claim 18, in which the priming substance is a polyvinyl cinnamate photoresist lacquer.

20. The method of claim 18, in which the priming substance is a vapour deposited metal chromate layer having a thickness of up to 500 A.

21. The method of claim 12, in which sensitization is effected by vapour deposition of a monoatomic layer of silver or gold.

22. The method of claim 12, in which the substrate is passed over the curcible at a rate such that the silver halide layer is formed in a thickness of from 0.1 to 1.5 microns.

23. The method of claim 12, in which the substrate is formed of freshly cleaved mica or quartz, further comprising heating said substrate under said vacuum conditions prior to and during deposition of said silver halide with radiant heating means located out of communication with said vacuum conditions, said heating being effected to a temperature of up to 200° C.

24. The method of claim 12, in which the substrate is formed of polyester or acetate film or plastics covered paper, further comprising heating said substrate under said vacuum conditions prior to and during the deposition of said silver halide with radiant heating means located out of communication with said vacuum conditions, said heating being effected to a temperature of up to 100° C.

25. The method of claim 12, further comprising priming the substrate with a substance that enhances the adhesion of the silver halide vapor thereto.

26. The method of claim 25, in which the priming substance is a vapour deposited metal chromate layer having a thickness of up to 500 A.

27. The method of claim 25, in which the priming substance is a polyvinyl cinnamate or polyisoprene photoresist lacquer.

28. The method of claim 1, wherein said silver halide-coated substrate has zero light sensitivity, further comprising the step of sensitizing said silver halide-coated substrate to convert it to a negatively imaging photogrphic material.

29. The method of claim 28, in which goldiridium sensitization is effected.

30. The method of claim 28, in which the substrate is passed over the crucible at a rate such that the silver halide layer is formed in a thickness of from 0.1 to 1.5 microns.

31. The method of claim 30, in which the substrate is passed over the crucible at a rate such that the silver halide layer is formed in a thickness of from 0.1 to 0.5 microns.

32. The method of claim 28, in which the substrate is formed of freshly cleaved mica or quartz, further comprising heating said substrate under said vacuum conditions prior to and during deposition of said silver halide with radiant heating means located out of communication with said vacuum conditions, said heating being effected to a temperature of up to 200° C.

33. The method of claim 28, in which the substrate is formed of polyester or acetate film or plastics covered paper, further comprising heating said substrate under said vacuum conditions prior to and during the deposition of said silver halide with radiant heating means located out of communication with said vacuum conditions, said heating being effected to a temperature of up to 100° C.

34. The method of claim 28, further comprising priming the substrate with a substance that enhances the adhesion of the silver halide vapor thereto.

35. The method of claim 34, in which the priming substance is a polyvinyl cinnamate or polyisoprene photoresist lacquer.

* * * * *